(12) United States Patent
Trimble et al.

(10) Patent No.: US 10,464,445 B2
(45) Date of Patent: Nov. 5, 2019

(54) PIVOTABLE ATTACHMENT DEVICE ATTACHABLE ONTO TRACKS

(71) Applicant: Safran Seats USA LLC, Gainesville, TX (US)

(72) Inventors: Robert W. Trimble, Gainesville, TX (US); Armando Valdes, Krum, TX (US)

(73) Assignee: Safran Seats USA LLC, Gainesville, TX (US)

( * ) Notice: Subject to any disclaimer, the term of this patent is extended or adjusted under 35 U.S.C. 154(b) by 153 days.

(21) Appl. No.: 14/895,199

(22) PCT Filed: Jun. 20, 2014

(86) PCT No.: PCT/US2014/043375
§ 371 (c)(1),
(2) Date: Dec. 1, 2015

(87) PCT Pub. No.: WO2014/205329
PCT Pub. Date: Dec. 24, 2014

(65) Prior Publication Data
US 2016/0107542 A1  Apr. 21, 2016

Related U.S. Application Data

(60) Provisional application No. 61/837,310, filed on Jun. 20, 2013.

(51) Int. Cl.
*B60N 2/075* (2006.01)
*B60N 2/015* (2006.01)
*B64D 11/06* (2006.01)

(52) U.S. Cl.
CPC ...... *B60N 2/01575* (2013.01); *B64D 11/0696* (2013.01); *B60N 2/075* (2013.01)

(58) Field of Classification Search
CPC ........ B60N 2/075; B60N 2/208; B60N 2/082; B60N 2/0868
USPC ......... 248/429, 424; 296/65.01, 65.11, 65.13
See application file for complete search history.

(56) References Cited

U.S. PATENT DOCUMENTS 5,234,189 A * 8/1993 Myers .................... B60N 2/071
 248/429
5,236,153 A * 8/1993 LaConte ............... B60P 7/0815
 244/118.6
5,918,846 A * 7/1999 Garrido .................. B60N 2/123
 248/424

(Continued)

FOREIGN PATENT DOCUMENTS

EP  2492197 A1  8/2012
EP  2664489 A1  11/2013

OTHER PUBLICATIONS

International Patent Application No. PCT/US2014/043375, Search Report and Written Opinion dated Oct. 9, 2014.

(Continued)

*Primary Examiner* — Alfred J Wujciak
(74) *Attorney, Agent, or Firm* — Kilpatrick Townsend & Stockton LLP; Dean W. Russell; Eben D. Allen

(57) ABSTRACT

Track fitting assembly having a base frame (12) comprising a pivot shaft (44) arranged so that the pivot shaft substantially aligns with an upper surface of a track when the base frame is coupled to the track and at least one pivotable insert (14) pivotally coupled to the pivot shaft.

24 Claims, 12 Drawing Sheets

(56) References Cited

U.S. PATENT DOCUMENTS

| | | | | |
|---|---|---|---|---|
| 7,328,877 B2* | 2/2008 | Yamada | ............... | B60N 2/0705 |
| | | | | 248/430 |
| 7,731,460 B2* | 6/2010 | Brown | ................... | B64D 9/003 |
| | | | | 410/77 |
| 8,528,860 B2* | 9/2013 | VanderWolk | ...... | B64D 11/0696 |
| | | | | 244/118.5 |
| 9,150,124 B2* | 10/2015 | Becker | ................ | B60N 2/0705 |
| 2005/0184550 A1* | 8/2005 | Jung | ................... | B60N 2/0705 |
| | | | | 296/65.13 |
| 2006/0091278 A1* | 5/2006 | McCulloch | .......... | B60N 2/0705 |
| | | | | 248/429 |
| 2007/0138821 A1* | 6/2007 | Mejuhas | ............ | B64D 11/0696 |
| | | | | 296/65.01 |
| 2012/0223565 A1* | 9/2012 | Yasui | ...................... | B60N 2/68 |
| | | | | 297/452.1 |

OTHER PUBLICATIONS

International Patent Application No. PCT/US2014/043375, International Preliminary Report on Patentability dated Dec. 30, 2015.

* cited by examiner

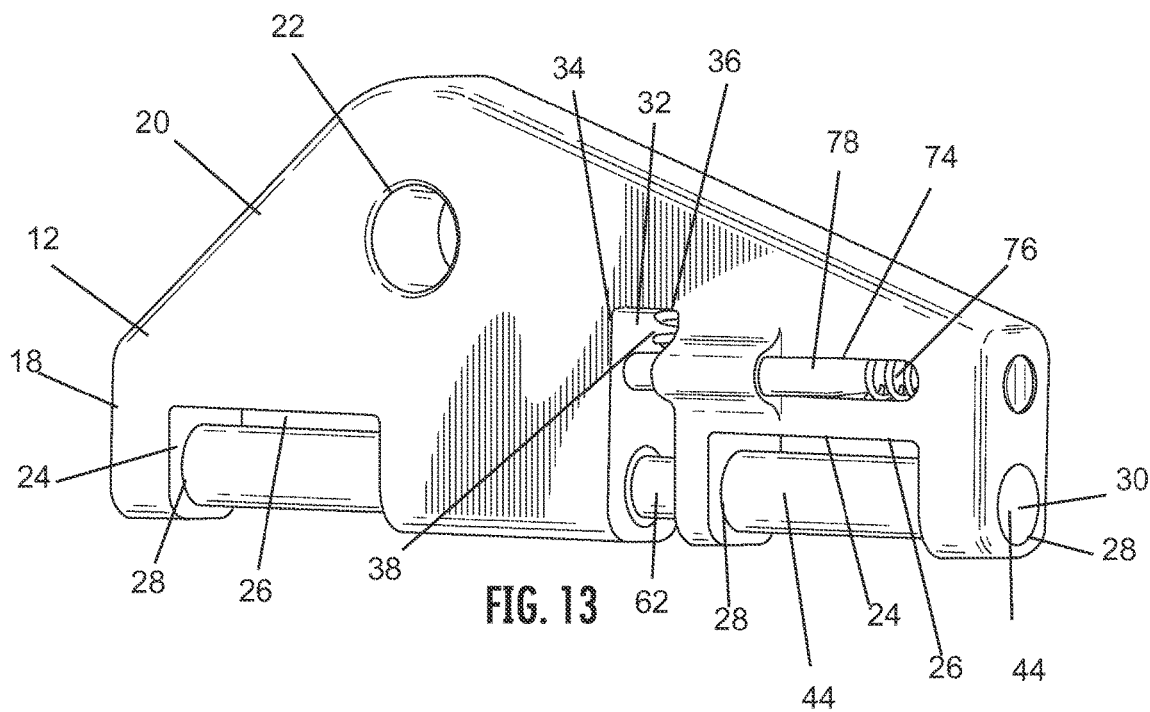
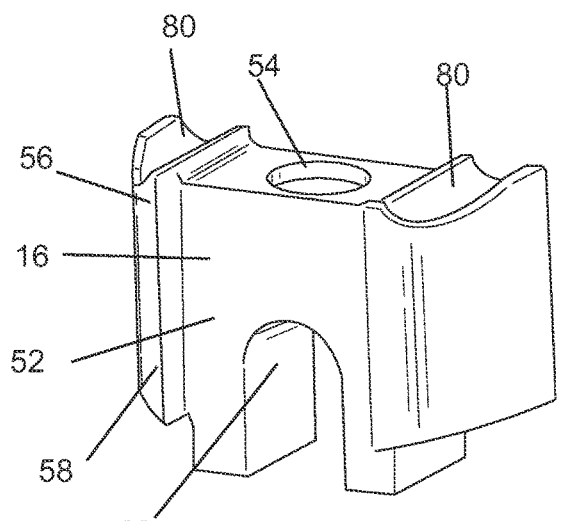
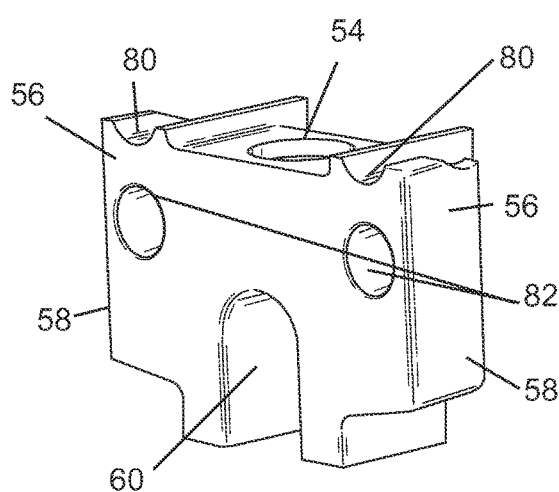

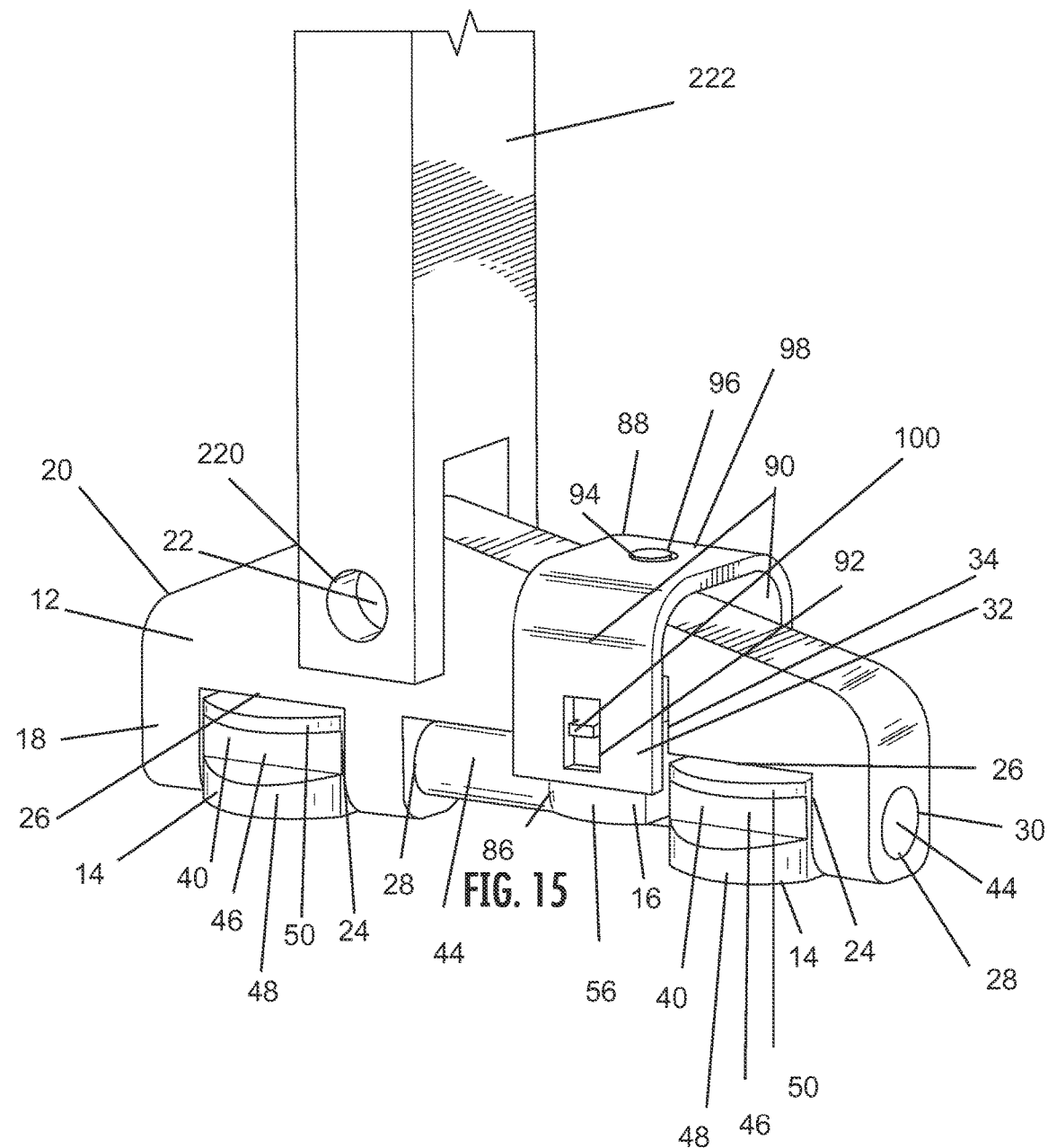

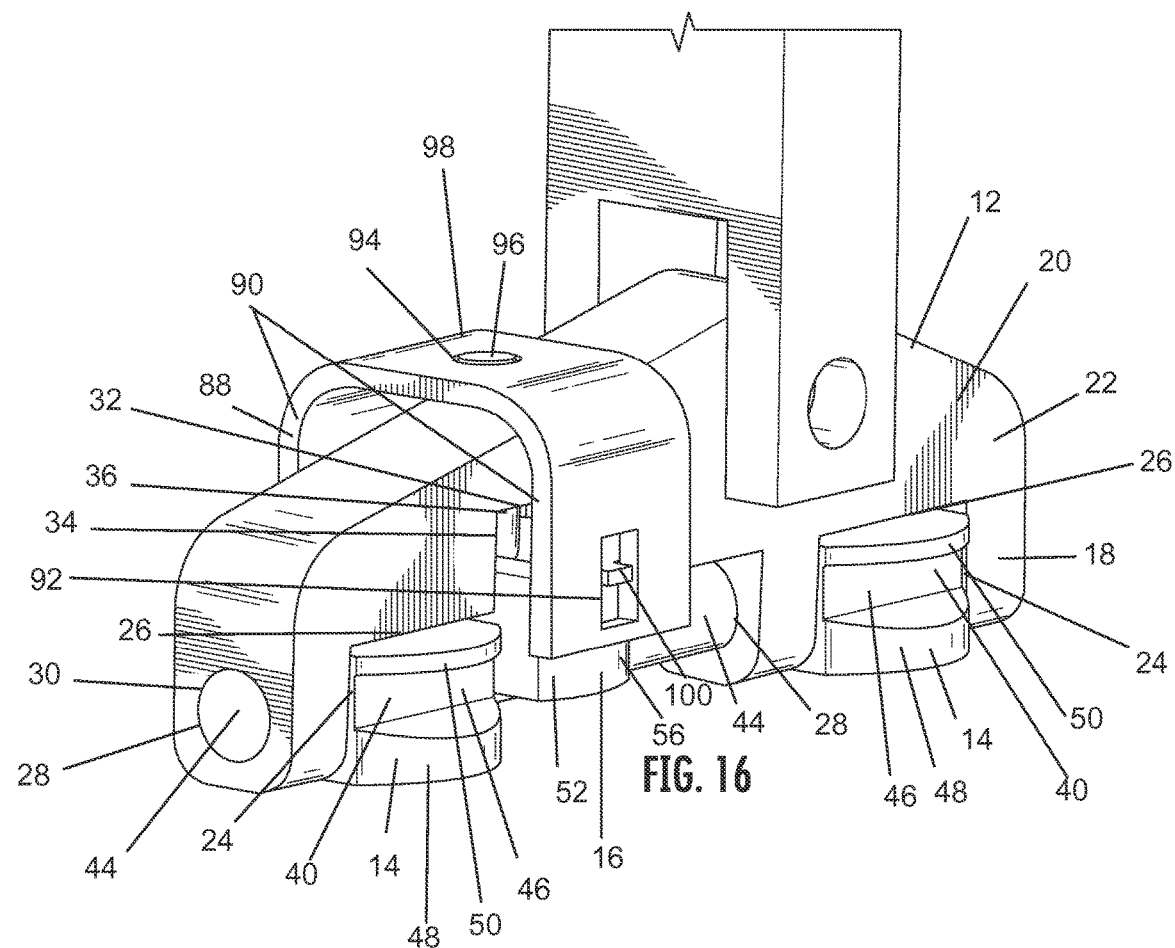

PIVOTABLE ATTACHMENT DEVICE ATTACHABLE ONTO TRACKS

CROSS REFERENCE TO RELATED APPLICATIONS

This application is the U.S. national phase entry of International Patent Application Serial No. PCT/US2014/043375 ("the '375 application"), filed on Jun. 20, 2014, which application is related to and claims priority benefits from U.S. Provisional Application Ser. No. 61/837,310 ("the '310 application"), filed on Jun. 20, 2013, entitled Pivotable Stud Track Fitting Mechanism. The '375 and '310 applications are hereby incorporated in their entireties by this reference.

FIELD OF THE INVENTION

The field of the invention relates to seat fitting assemblies for passenger seats or the like.

BACKGROUND

Many vehicle seats such as those on passenger aircraft, buses, trains, and the like are removably mounted in a track fitting assembly secured to the floor of the vehicle. The track 200 typically include a channel 202 along its entire length, where two lips 204 partially enclose an upper side of the channel 202 to form a slot 208. Semicircular cutout portions are uniformly spaced along the lips 204 to create a series of larger circular openings 212 in the slot 108 with narrower spacing in locations 206 between adjacent larger circular openings 212.

Typically, a track fitting assembly, such as the conventional track fitting assembly 214 shown in FIG. 1, is used to couple the passenger seat to the track. The conventional track fitting assembly 214 incorporates fixed studs 216 mounted on a base frame 218 with a pivotable attachment point 220 between the base frame 218 and a seat leg 222 of the passenger seat.

The fixed studs 216 extend outwardly from the base frame 218. The studs 216 are typically designed with a flared end attached to a narrower neck. The flared ends of the studs 216 pass through the larger openings 212 of the track 200, and the track fitting assembly 214 is moved along the track 200 until the flared ends contact the underside of the slot lips 204. Bolts or wedge-type elements are commonly used to create a snug fit between the studs 216 and the track lips 204 to prevent seat rattle and unintended seat displacement.

These conventional track fitting assembly designs limit the moments transferred to the seat leg 222 when the seat track is rolled per requirements of AS8049. However, these designs still transfer a considerable amount of preload to the seat leg 222 due to the axis of rotation of the base frame 218 not being close to the axis of rotation of the track 200 when rolled.

Accordingly, there is a need for a passenger seat track fitting assembly that limits the moments transferred to the seat leg when the seat track is rolled, while also providing an axis of rotation of the base frame that is closer to the axis of rotation of the track when rolled to minimize any type of preload into the base member and the seat leg.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiment of the present invention, a pivotable stud track fitting assembly comprises a base frame comprising a pivot shaft arranged so that the pivot shaft substantially aligns with an upper surface of a track when the base frame is coupled to the track, and at least one pivotable insert pivotally coupled to the pivot shaft. In some embodiments, at least one plunger may be coupled to the base frame. In other embodiments, at least one plunger may be pivotally coupled to the pivot shaft.

The at least one plunger may comprise a pair of spacers within a main body of the at least one plunger.

In some embodiments, a material used to form the at least one pivotable insert is heavier than the material used to form the base frame. The at least one pivotable insert may be formed of titanium, and the base frame may be formed of aluminum.

In certain embodiments, at least two pivotable inserts are pivotally coupled to the pivot shaft. The base frame may comprise an upper portion configured to pivotally couple to a leg of a passenger seat. In some embodiments, the at least one pivotable insert may further comprise a pair of upper flanges and a pair of lower flanges.

BRIEF DESCRIPTION OF THE DRAWINGS

FIG. 13 is a perspective view of the pivotable stud track fitting assembly of FIG. 10 with the inserts and plunger removed.

FIG. 14A is a front perspective view of the plunger of the pivotable stud track fitting assembly of FIG. 10.

FIG. 14B is a rear perspective view of the plunger of FIG. 14A.

FIG. 15 is a perspective view of a pivotable stud track fitting assembly uncoupled from a track and coupled to a seat leg of a passenger seat, according to certain embodiments of the present invention.

FIG. 16 is another perspective view of the pivotable stud track fitting assembly of FIG. 15.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The described embodiments of the invention provide pivotable stud track fitting assemblies for passenger seats. While the pivotable stud track fitting assemblies are discussed for use with aircraft seats, they are by no means so limited. Rather, embodiments of the pivotable stud track fitting assemblies may be used in passenger seats or other seats of any type or otherwise as desired.

According to certain embodiments of the present invention, as shown in FIGS. 2-17, a pivotable stud track fitting assembly 10 comprises a base frame 12 and at least one pivotable insert 14. In certain embodiments, at least one plunger 16 may also be included but may be omitted in certain applications.

Figure 1:
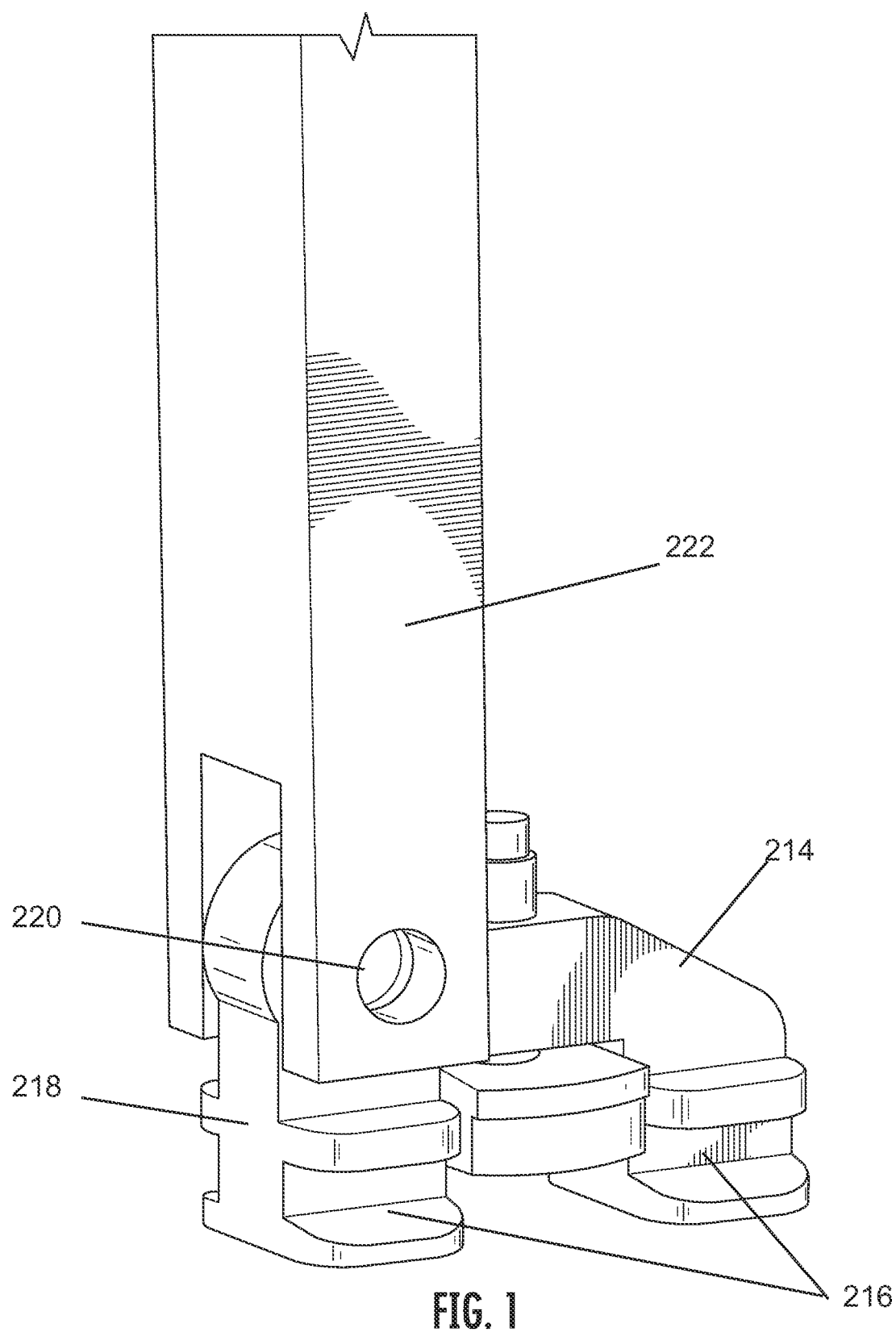
FIG. 1 is a perspective view of a conventional track fitting assembly coupled to a seat leg of a passenger seat.
Figure 2:
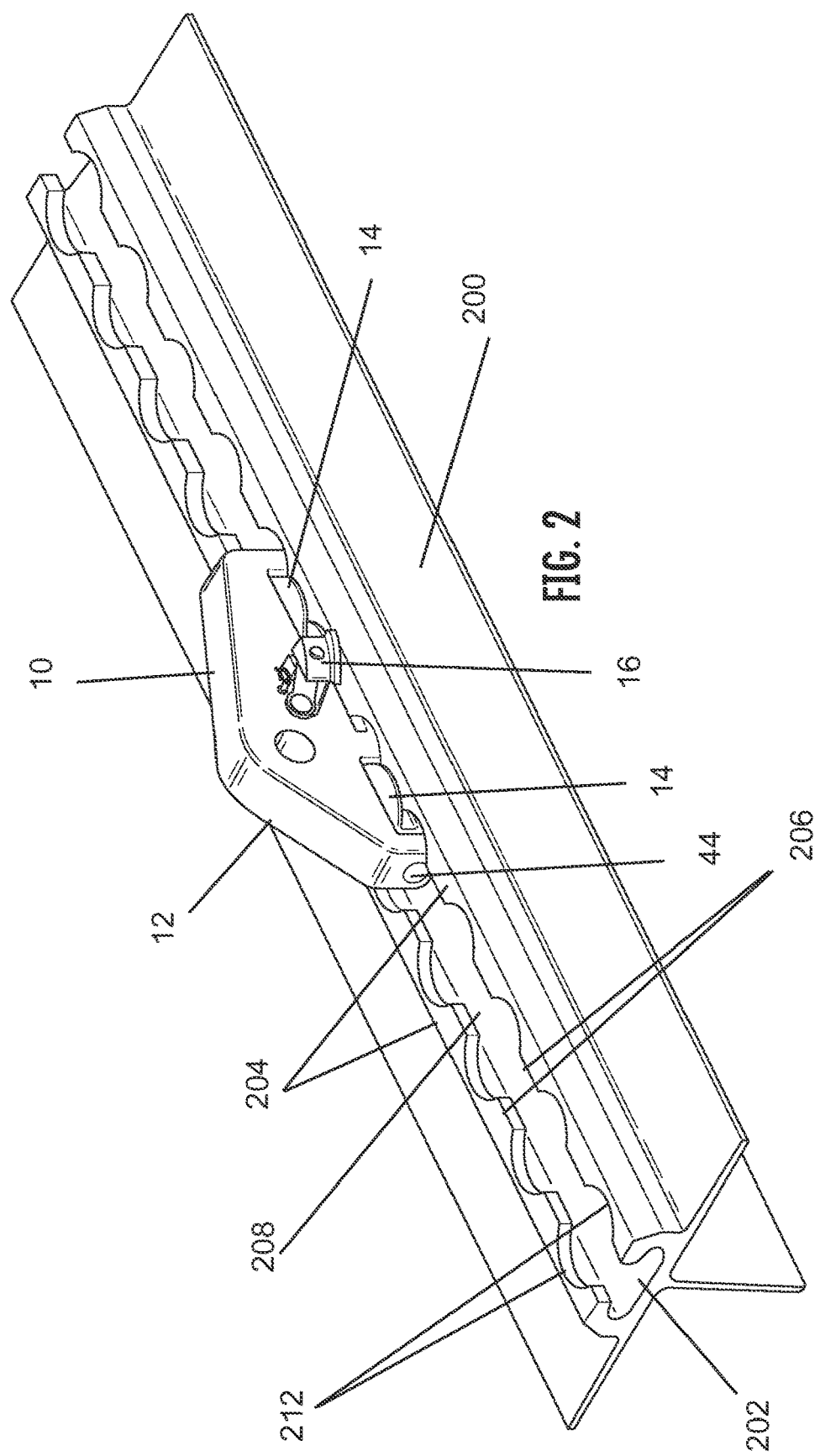
FIG. 2 is a perspective view of a pivotable stud track fitting assembly coupled to a track, according to certain embodiments of the present invention.

The base frame 12 may have any suitable shape that provides sufficient stability and strength to support a passenger seat coupled to the track 200. For example, as illustrated in FIGS. 2-6 and 10-13, the base frame 12 may have a substantially rectilinear lower portion 18 and a substantially triangular upper portion 20 (when viewed from a direction perpendicular to a longitudinal axis X of the base frame 12). In these embodiments, the upper portion 20 comprises an aperture 22 having an axis oriented substantially perpendicular to the longitudinal axis X of the base frame 12. The aperture 22 is shaped to pivotally couple to the seat leg 222 of a passenger seat, as shown in FIG. 1 (coupled to a conventional track fitting assembly 214) and in FIGS. 15-17. The upper portion 20 may be pivotally coupled to the seat leg 222 via a pivot shaft, bolt, rivet, or other suitable mechanical fastener.

As best illustrated in FIGS. 6, 12-13, and 15-17, the lower portion 18 has a lateral shape that is configured to fit within the narrowest width of the slot 208 of the track 200 so that the base frame 12 may be transitioned along the track 200 (as described in detail below). The lower portion 18 further comprises at least one pivotal coupling location 24 for attaching at least one insert 14. Each pivotal coupling location 24 may comprise a recess 26 separating a pair of apertures 28 having concentrically aligned central axes that are oriented substantially parallel to the longitudinal axis X of the base frame 12. In certain embodiments, a central bore 30 may be formed through the entire lower portion 18 so that the central bore 30 and each pair of apertures 28 share the same central axis.

The lower portion 18 may further comprise a plunger coupling location 32 comprising a slot 34. An upper end 36 of the slot 34 may further comprise a receptacle that is shaped to receive at least a portion of a spring 38 when the spring 38 is in a semi-compressed state (such as when the plunger 16 is in a locked position, as described in more detail below), and substantially all of the spring 38 when the spring 38 is in a substantially compressed state (such as when the plunger 16 is in a raised position, as described in more detail below).

Figure 3:
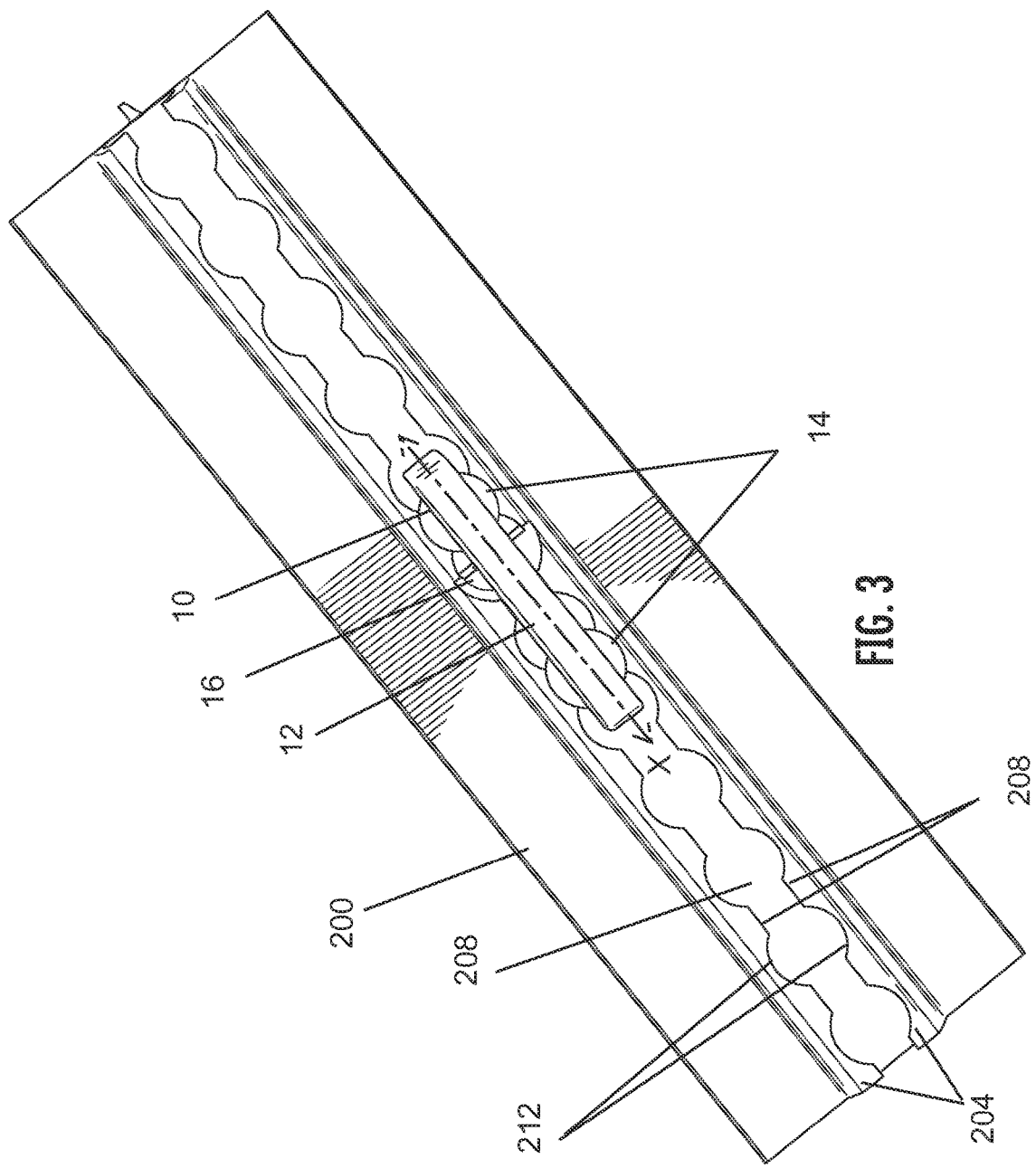
FIG. 3 is a top view of the pivotable stud track fitting assembly of FIG. 2.
Figure 4:
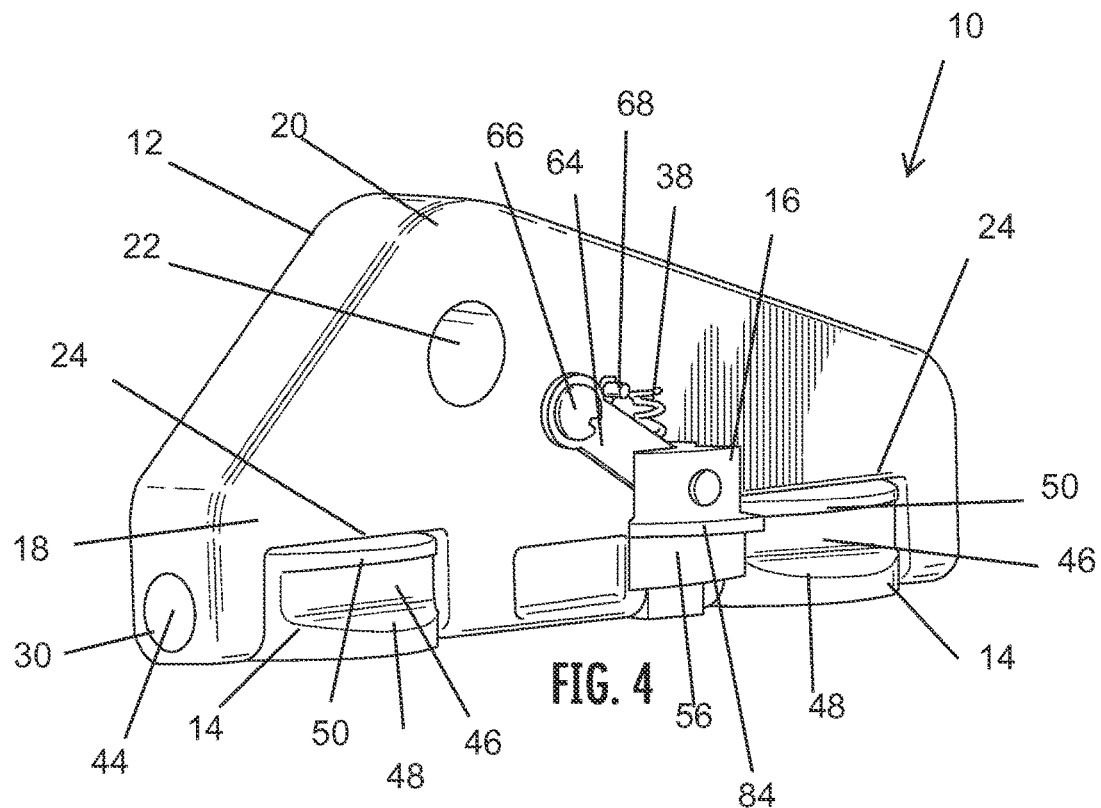
FIG. 4 is a perspective view of the pivotable stud track fitting assembly of FIG. 2 uncoupled from the track.
Figure 5:
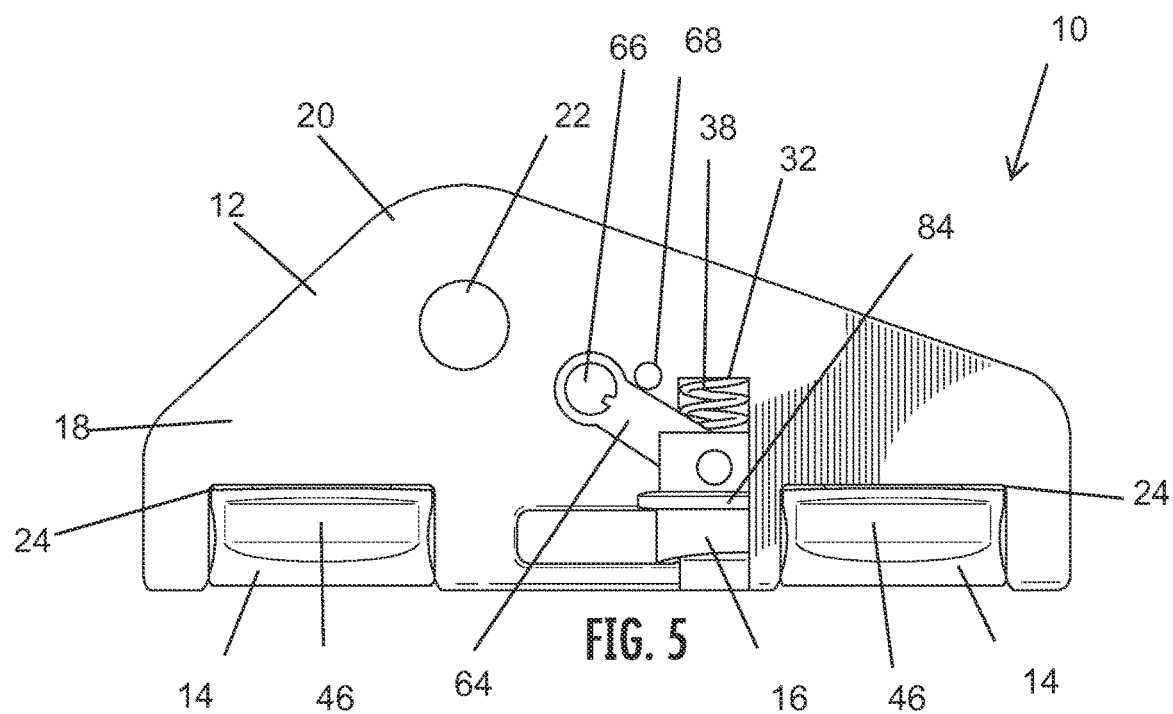
FIG. 5 is a side view of the pivotable stud track fitting assembly of FIG. 4.
Figure 6:
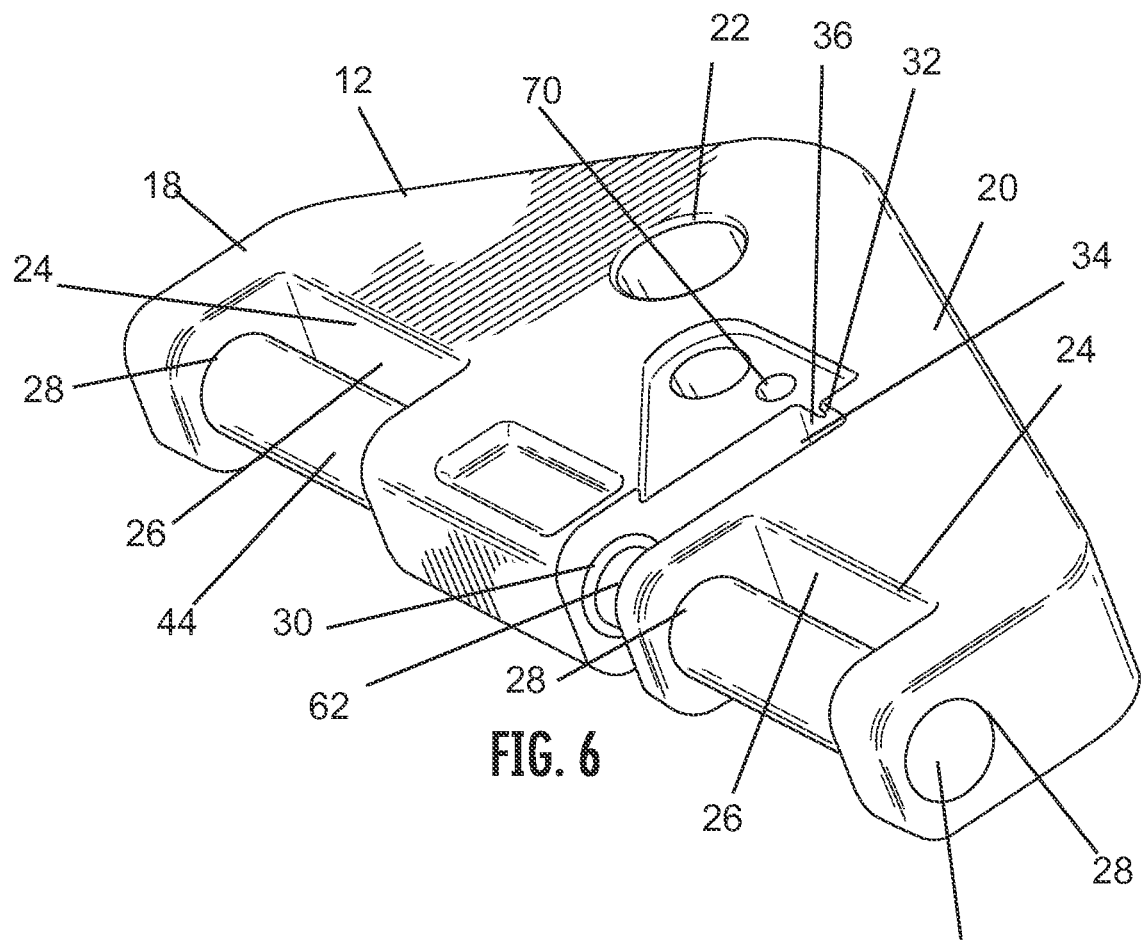
FIG. 6 is a perspective view of the pivotable stud track fitting assembly of FIG. 4 with the inserts and plunger removed.
Figure 7:
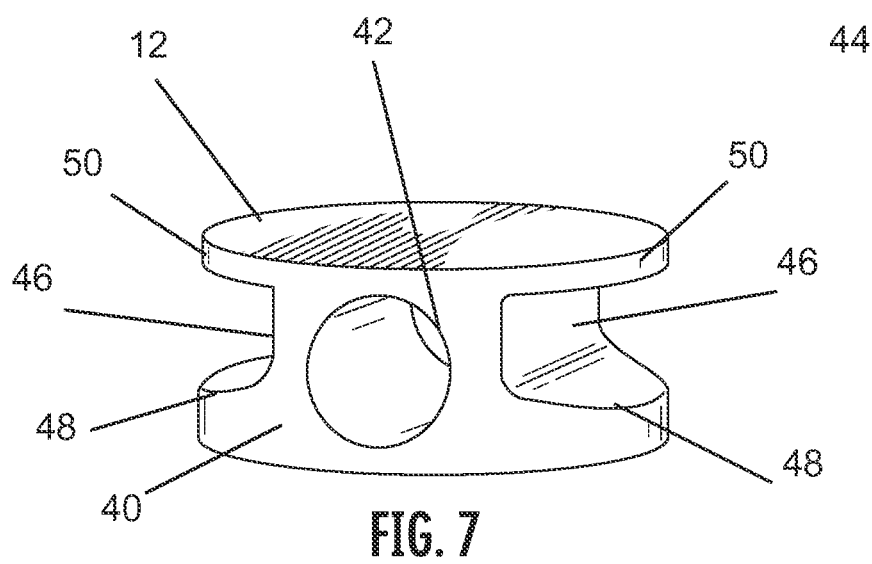
FIG. 7 is a perspective view of the insert of the pivotable stud track fitting assembly of FIG. 4.
Figure 8A:
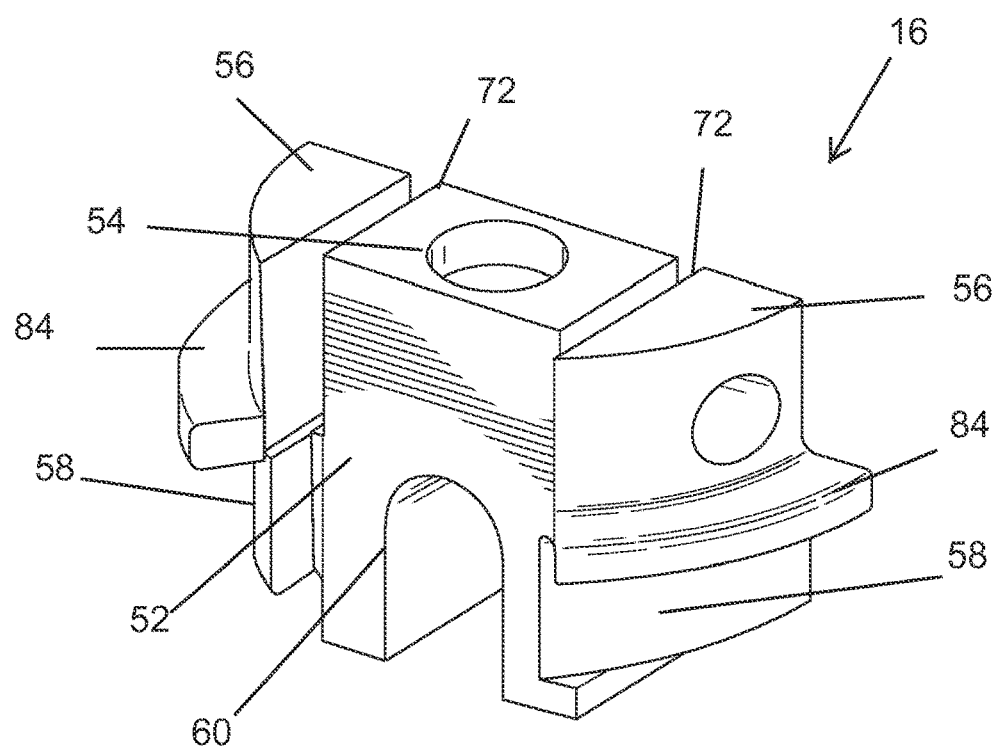
FIG. 8A is a front perspective view of the plunger of the pivotable stud track fitting assembly of FIG. 4.
Figure 8B:
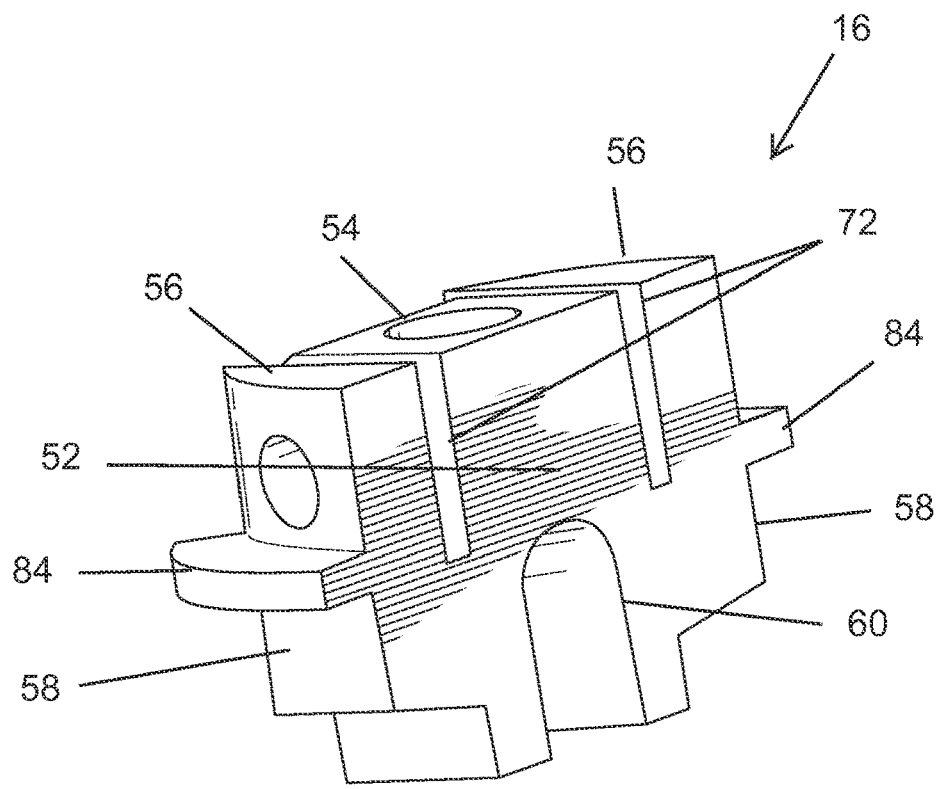
FIG. 8B is a rear perspective view of the plunger of FIG. 8A.
Figure 9:
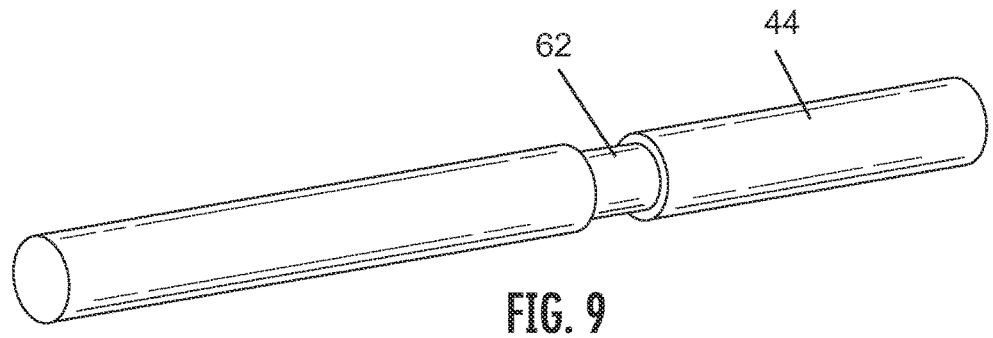
FIG. 9 is a front perspective view of the pivot shaft of the pivotable stud track fitting assembly of FIG. 4.
Figure 10:
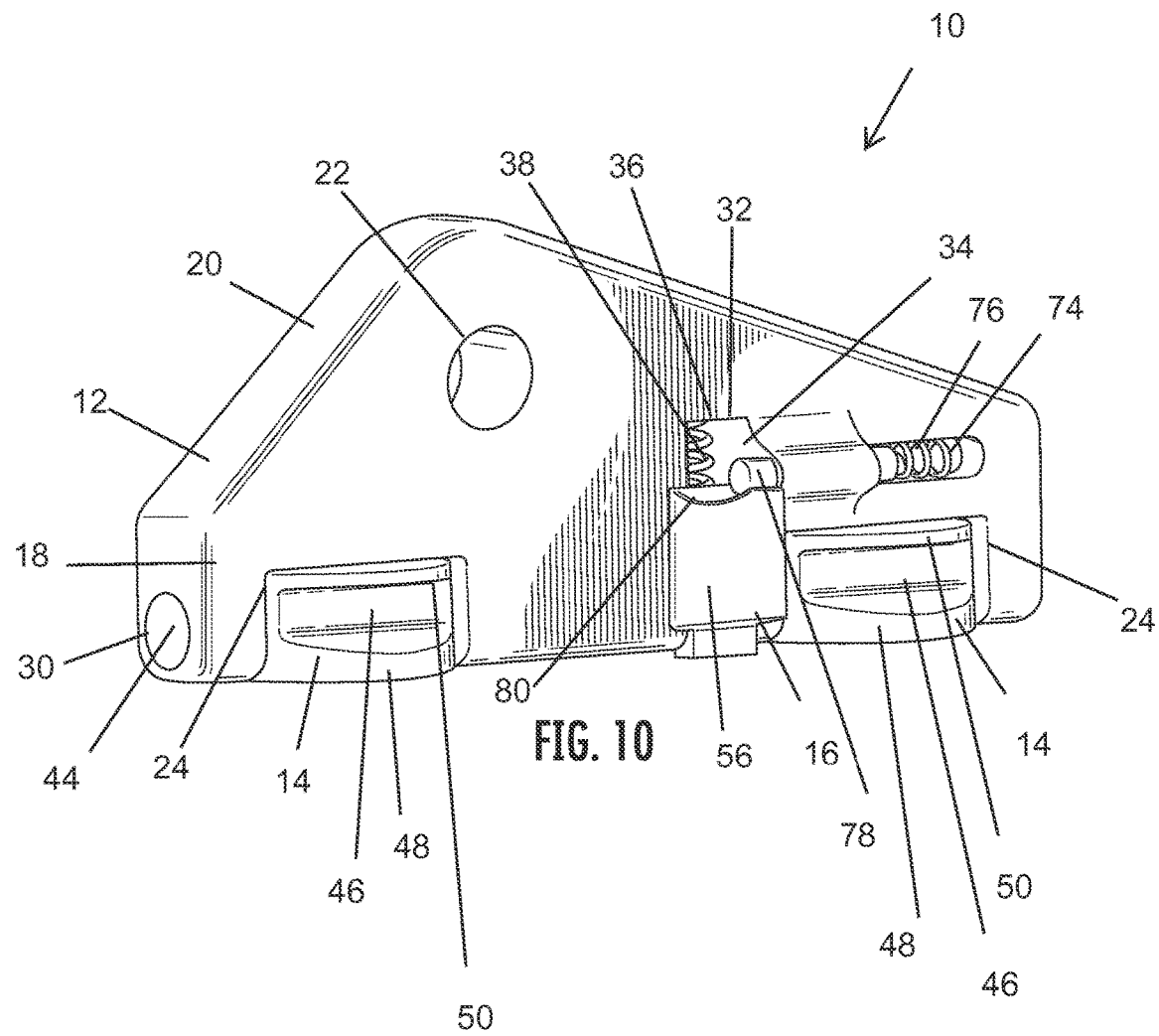
FIG. 10 is a perspective view of a pivotable stud track fitting assembly uncoupled from a track, according to certain embodiments of the present invention.
Figure 11:
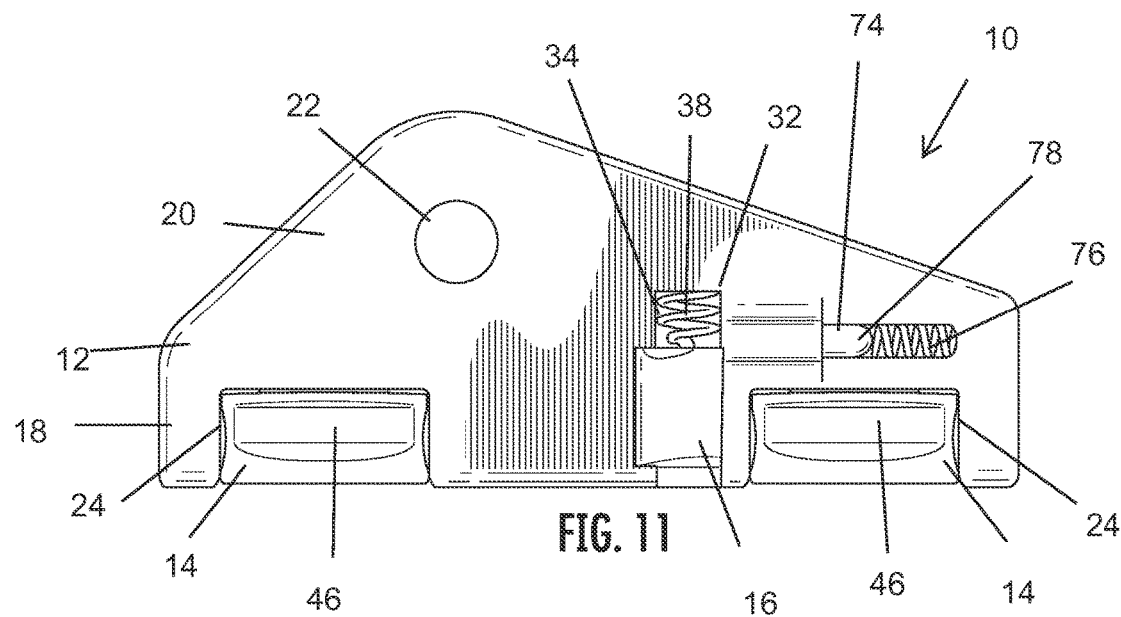
FIG. 11 is a side view of the pivotable stud track fitting assembly of FIG. 10.
Figure 12:
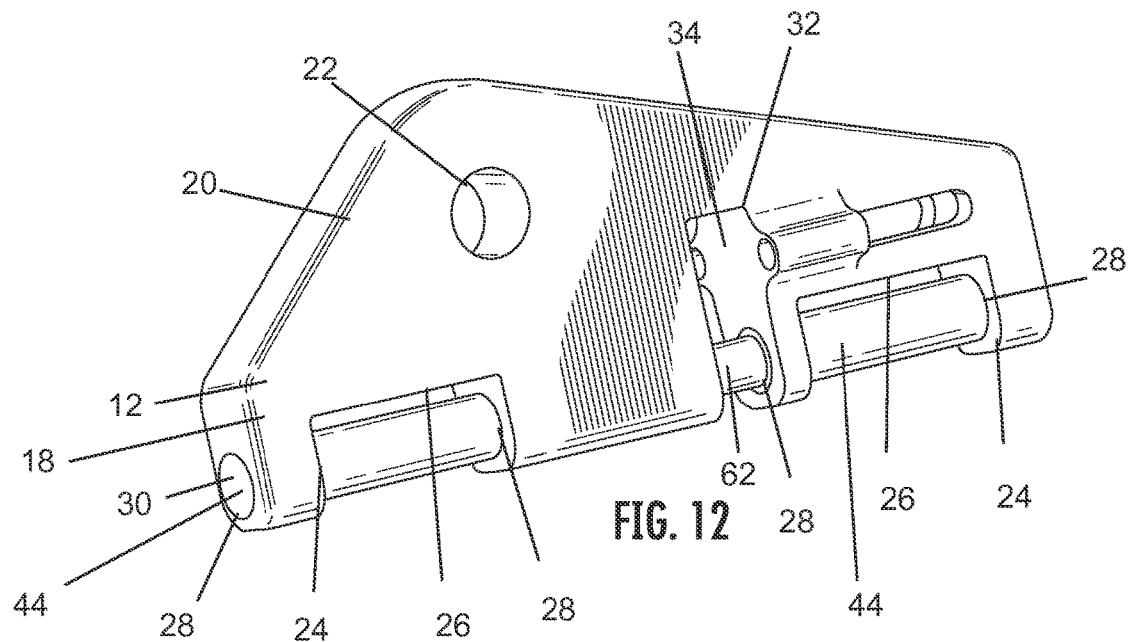
FIG. 12 is a perspective view of the pivotable stud track fitting assembly of FIG. 10 with the inserts, plunger, and horizontally oriented locking device removed.

In some embodiments, as illustrated in FIGS. 3-4, each insert 14 comprises a central body 40 having an aperture 42. To couple each insert 14 to the base frame 12, the insert 14 is positioned within the recess 26 of each pivotal coupling location 24 so that the aperture 42 is substantially aligned with the pair of apertures 28. A pivot shaft, bolt, rivet, or other suitable mechanical fastener may be inserted through at least the aperture 42 and the apertures 28 to pivotally couple the insert 14 to the base frame 12. In the embodiments shown in FIGS. 2-17, a single pivot shaft 44 is inserted through the central bore 30 (which spans substantially the entire longitudinal length of the base frame 12).

The insert 14 may have any suitable shape having at least a lower portion that is capable of being inserted through one of the larger circular openings 212 in the slot 208 of the track 200, while also being configured to at least bias against an underside of the lips 204 in the location 206 between adjacent larger circular openings 212. Specifically, the insert 14 may have any suitable cross-sectional shape (as viewed from a direction along the longitudinal axis X) including a dome, an inverted "T", an "I", conical, parabolic, oval, or other similar shapes.

To bias against the underside of the lips 204, the insert 14 may comprise a pair of grooves 46 formed within opposite sides of the central body 40 and oriented substantially parallel to a longitudinal axis of the aperture 42 in the central body 40, wherein a lower portion of each groove 46 forms a lower flange 48. The lower flange 48 of each insert 14 may be held in place via a downward force applied by the plunger 16, as described in detail below.

In certain embodiments, as shown in FIGS. 2-17, the pair of grooves 46 on the insert 14 may be shaped so that an upper portion of each groove 46 forms an upper flange 50. The upper flange 50 may be used to bias the insert 14 against the outer side of the lips 204 in the location 206 between the larger circular openings 212 as a means of preventing the pivotable stud track fitting assembly 10 from extending too deeply into the channel 202 of the track 200. As a result, the combination of the upper flange 50 and the lower flange 48 biasing against opposing sides of the lip 204 may result in the insert 14 acting as a clamp around the location 206 between the larger circular openings 212. The inclusion of the upper flange 50 with the inserts 14 may be desirable in certain embodiments, such as where the track 200 has a deep channel 202 to allow cables or other wiring to route through the track 200 below the pivotable stud track fitting assembly 10. However, the inclusion of the upper flange 50 is optional and may not be included in various embodiments.

In some embodiments, as shown in FIGS. 2-5, 8A-8B, 10-11, 14A-14B, and 15-17, the plunger 16 is coupled to the plunger coupling location 32 in the base frame 12 in a manner that allows the plunger 16 to transition vertically between an unlocked position relative to the track 200 (where the plunger 16 is in a raised position relative to the slot 34) and a locked position relative to the track 200 (where the plunger 16 is in a lowered position relative to the slot 34).

In these embodiments, the plunger 16 may have a central body 52 that is shaped to fit within the slot 34. For example, the central body 52 may comprise an upper surface 54 that is positioned within the slot 34 and shaped so as to retain the spring 38 between the upper surface 54 of the plunger 16 and the receptacle in the upper end 36 of the slot 34. When the plunger 16 is in the unlocked position, the plunger 16 is raised so that it presses against the spring 38 causing the spring 38 to compress between the upper surface 54 and the receptacle in the upper end 36. Conversely, when the plunger 16 is in the locked position, the spring 38 at least partially uncompresses to push the plunger 16 into the lowered locked position. In other embodiments, as shown in FIGS. 15-17, a bracket 88 and shaft 96 design may be used instead of the spring 38 concept, as described in more detail below.

In the various embodiments shown in FIGS. 2-17, the plunger 16 is configured so that the locked position corresponds to a position of the base frame 12 within the slot 208 where an upper edge of the central bore 30 (and consequently an upper edge of the pivot shaft 44) substantially aligns with an upper surface of the lips 204 of the track 200 when the plunger 16 is in the locked position. Through this positioning of the pivot location of the base frame 12 in close proximity to the upper surface of the lips 204, a bending moment between the base frame 12 and the track 200 is substantially minimized and may be virtually eliminated in certain embodiments, particularly as compared to the prior art design where the bending moment was located at the pivotable attachment point 220, which is at least 0.8 inches to 1.5 inches above the upper surface of the lips 204.

Figure 17:
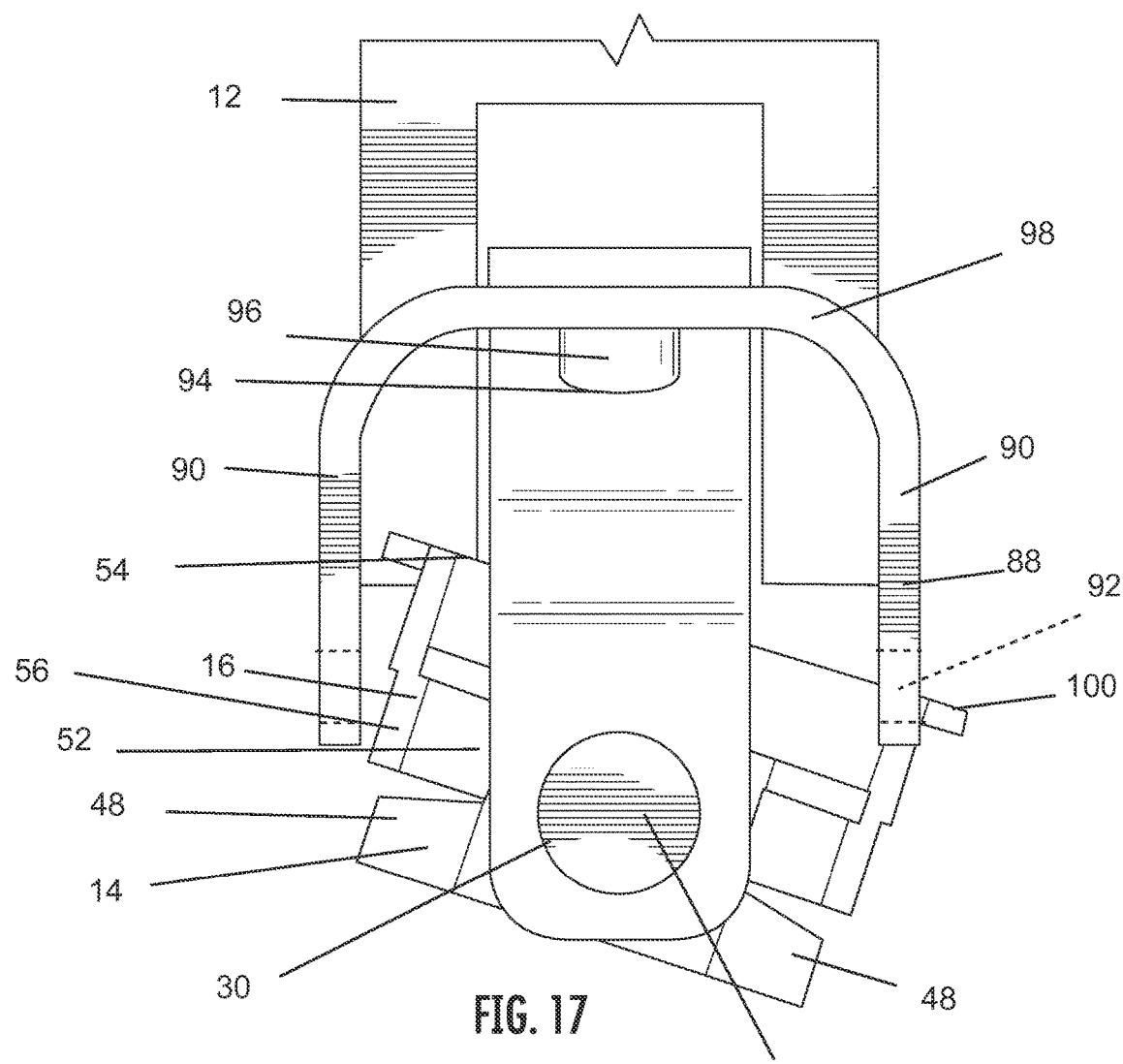
FIG. 17 is a front view of the pivotable stud track fitting assembly of FIG. 15 showing the rotation of the plunger and the inserts relative to the base frame.

The central body 52 of the plunger 16 may be coupled to the base frame 12 in a manner that either prevents (as shown in FIGS. 2-5, 8A-8B, 10-11, and 14A-14B) or allows (as shown in FIGS. 15-17) lateral rotation of the central body 52 relative to the base frame 12. In either case, the plunger 16 may comprise a pair of wings 56, each having a curved outer surface 58 that is shaped to substantially conform to the curve of the larger circular opening 212, which allows the plunger 16 to extend downward into the larger circular opening 212 in the slot 208 of the track 200. The curved shape of the outer surfaces 58 allows the plunger 16 to snugly fit within the at least a portion of the larger circular opening 212. In these embodiments, the wings 56 and the central body 52 may have any suitable combined cross-sectional shape (when viewed from above) including but not limited to circular, semicircular, oval, triangular, parabolic, rectilinear, horse-shoe, or other similar shapes. In the embodiments illustrated in FIGS. 2-17, the plunger 16 has a curved shape oriented toward a front end of the base frame 12 and a flat side oriented toward a rear end of the base frame 12.

In the embodiments where the central body 52 does not laterally pivot relative to the base frame 12, as shown in FIGS. 2-5, 8A-8B, 10-11, and 14A-14B, the central body 52 may include an opening 60 that is shaped to allow the plunger 16 to slide over the pivot shaft 44 extending through the central bore 30 without being directly coupled to the pivot shaft 44. The opening 60 has a length that allows the plunger 16 to move between the locked and unlocked vertical positions without interference from the pivot shaft 44. Furthermore, the opening 60 may include a rounded upper surface that is shaped to articulate against the surface of the pivot shaft 44 when the base frame 12 rotates relative to the track 200 and the plunger 16 is in the lowered locked position. In certain cases, the pivot shaft 44 may also include a niche 62 that is configured to interlock with edges of the opening 60, which may also serve to hold the pivot shaft 44 into position within the central bore 30.

In certain embodiments, as shown in FIGS. 2-5 and 8A-8B, a pair of lever arms 64 are pivotally coupled at one end to the base frame 12 via a pivot shaft 66 and coupled at an opposing end to the wings 56 of the plunger 16. In other embodiments, the lever arms 64 may be coupled to the central body 40 of the plunger 16 or any other suitable location on the plunger 16. A locking pin 68 may be inserted through an aperture 70 in the base frame 12 to hold the pair of lever arms 64 in the locked position.

Because the central body 52 of the plunger 16 is laterally coupled to the base frame 12 in these embodiments, the plunger 16 may be configured with spacers 72 between a portion of the central body 52 and each wing 56 to absorb some of the lateral shear force that would otherwise be applied by the plunger 16 to the lips 204 of the track 200 when the base frame 12 rotates relative to the track 200. For example, the spacers 72 are configured so that each lever arm 64 is coupled to the wing 56 within the spacer 72, which allows the central body 52 to bend slightly (approximately 5-10 degrees) in each lateral direction relative to the corresponding wing 56 (wherein the central body 52 is coupled to each wing 56 below the spacer 72). The lever arms 64 themselves may also be configured to bend before the shear load is transferred to the track 200.

In other embodiments, as shown in FIGS. 10-11 and 14A-14B, the plunger 16 is held in the locked position via a horizontally oriented locking device 74. The locking device 74 comprises a spring 76 that presses against a U-shaped pin 78 so that the U-shaped pin 78 extends forward over the upper surface 54 of the plunger 16. The plunger 16 further comprises channels 80 that correspond to the prongs of the U-shaped pin 78 to further engage the plunger 16 with the locking device 74. The plunger 16 further comprises a pair of apertures 82 that are positioned to engage with the prongs of the U-shaped pin 78 to hold the plunger 16 in the unlocked position against the spring 38.

In certain embodiments, the plunger 16 may be configured to apply the downward force to the track 200 through contact with an upper surface of the lips 204 of the track 200 (as shown in FIGS. 2-5 and 8A-8B) or through contact with a lower surface of the channel 202 of the track 200 (as shown in FIGS. 10-11, 14A-14B, and 15-17). In the case where the plunger 16 is configured to apply the downward force through contact with an upper surface of the lips 204 of the track 200, as shown in FIGS. 2-5 and 8A-8B, a projection 84 may be positioned on the outer surface 58 of each wing 56 at a height that contacts the upper surface of the lips 204 when base frame 12 reaches the desired depth within the slot 208 (as described above with respect to the bending moment of the base frame 12 relative to the track 200). This type of locking arrangement between the plunger 16 and the track 200 may be desirable in certain embodiments where the track 200 has a deep channel 202 that is configured to allow cables or other wiring to route through the track 200 below the pivotable stud track fitting assembly 10.

In other embodiments where the plunger 16 is configured to apply the downward force through contact with the lower surface of the channel 202 of the track 200, as shown in FIGS. 10-11, 14A-14B, and 15-17, the plunger 16 has a vertical length that is configured to contact the lower surface of the channel 202 when the base frame 12 reaches the desired depth within the slot 208 (as described above with respect to the bending moment of the base frame 12 relative to the track 200).

In certain embodiments, it may be desirable to configure the plunger 16 so as to only apply a downward force to lock the pivotable stud track fitting assembly 10 to the track 200 so as to avoid a situation where the plunger 16 is applying both a shear force and a vertical force to the track 200. In some embodiments, such as where the plunger 16 is laterally locked into position relative to the base frame 12 and may not include the spacers 72 to deflect some of the shear force between the plunger 16 and the track 200, the plunger 16 may either not include the wings 56 or may be shaped so as to not conform as snugly to the contour of the larger circular opening 212.

In the embodiments where the plunger 16 laterally pivots relative to the base frame 12, as shown in FIGS. 15-17, the central body 52 may include an opening 86 that is shaped to allow the plunger 16 to couple to the pivot shaft 44 extending through the central bore 30. Because the plunger 16 still has to vertically articulate between the locked and unlocked positions, the opening 86 may have an elongated shape that will slide over the pivot shaft 44 between the unlocked and locked positions while also coupling to the pivot shaft 44 for lateral pivoting.

A U-shaped bracket 88 may be coupled to the base frame 12 as a means to couple the plunger 16 to the base frame 12. For example, bracket 88 may be configured to fit around the upper portion 20 of the base frame 12 so that sides 90 of the bracket 88 extend down over the base frame 12 in a location proximate to the plunger 16. The sides 90 may comprise a pair of aligned slots 92 that are configured to engage a corresponding projection 100 that extends from each lateral side of the plunger 16. The slotted design allows the plunger 16 to pivot relative to the base frame 12, while also remaining coupled to the base frame 12 via the slots 92 in the bracket 88. The base frame 12 may further comprise a vertical bore 94 that allows a shaft 96 to extend between an upper surface 98 of the bracket 88 and the upper surface 54 of the plunger 16. The bracket 88 may be configured to vertically translate relative to the base frame 12 so that the bracket 88 may exert a force against the plunger 16 to transition the plunger 16 into the locked position. The bracket 88 may lock against the surface of the base frame 12 so that the plunger 16 remains in the locked position until the bracket 88 is unlocked from the surface of the base frame 12.

In the various embodiments described above, the base frame 12 is coupled to the track 200 by first positioning the base frame 12 over the track 200 in a location where each insert 14 is aligned with a larger circular opening 212. Once each insert 14 is positioned within the corresponding larger circular opening 212 to a depth such that the lower flange 48 is positioned below the lips 204, the base frame 12 is transitioned along the track 200 until the lower flange 48 of each insert 14 is positioned below a location 206 between the larger circular openings 212. The plunger 16 is then lowered into one of the larger circular openings 212 that is now aligned with the location of the plunger 16 after the base frame 12 is transitioned to the new position. Once the plunger 16 reaches the locked position (via contact between the projection 84 and the outer surface of the lips 204 or via contact by the central body 52 and/or wings 56 with the lower surface of the channel 202 of the track 200), the pivotable stud track fitting assembly 10 is locked into place via the appropriate locking mechanism (e.g., the locking pin 68, the locking device 74, or the bracket 88).

By incorporating a modular design between the inserts 14 and the base frame 12, the components may be formed of different materials depending on the particular needs of the application. For example, when the base frame 12 and the inserts 14 were integrally forged as a single part in the conventional design, the only option was to use a heavy material that provided the necessary strength for the inserts 14 to engage with the track 200. In contrast, in the embodiments described herein, the base frame 12 may be formed of lighter weight aluminum, while the insert 14 and/or the plunger 16 may be formed of higher strength/heavier titanium or steel. The various components may also be formed via casting, forging, and/or machining. In any event, the base frame 12, the insert 14, and/or the plunger 16 may be formed of materials including but not limited to aluminum, stainless steel, other metallic materials, composite materials, or other similar materials that provide sufficient strength and stability to secure the passenger seat to a track 200 to prevent seat rattle and to withstand forces that may be placed on the passenger seat.

The modular design also saves on material costs and waste by having the ability to simply replace a damaged insert 14 without the need to scrap the entire base frame 12. Likewise, the modular design provides a way to provide precision inserts 14 that are specifically designed for the various shapes of track 200 while being able to use a single version of the base frame 12. In certain embodiments, a vertical bend or hinge may be incorporated into the base frame 12 to allow the base frame 12 to be used where two tracks 200 meet (i.e., to transition between a constant track 200 and a non-constant track 200 that is tapering toward the nose of the aircraft).

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A pivotable stud track fitting assembly for attaching a seat leg of a passenger seat to a vehicle floor, the pivotable stud track fitting assembly comprising:

a track comprising a slot, wherein the track is attached to the vehicle floor;

a base frame comprising a pivot shaft that is disposed within the slot and arranged so that the pivot shaft substantially aligns with an upper surface of the track when the base frame is coupled to the track, wherein the base frame comprises an upper portion configured to pivotally couple to the seat leg of the passenger seat; and at least one pivotable insert that engages the track and is pivotally coupled to and separately rotatable relative to the pivot shaft such that the base frame is rotatable relative to the track about the pivot shaft.

2. The pivotable stud track fitting assembly of claim 1, wherein a material used to form the at least one pivotable insert is heavier than the material used to form the base frame.

3. The pivotable stud track fitting assembly of claim 1, wherein at least a portion of the at least one pivotable insert comprises a cylindrical shape.

4. The pivotable stud track fitting assembly of claim 1, wherein:
the slot comprises at least one lip; and
the at least one pivotable insert engages the at least one lip of the slot.

5. The pivotable stud track fitting assembly of claim 1, further comprising at least one plunger coupled to the base frame, wherein the at least one plunger is moveable between a plurality of different positions.

6. The pivotable stud track fitting assembly of claim 5, wherein the at least one plunger comprises a pair of spacers within a main body of the at least one plunger.

7. The pivotable stud track fitting assembly of claim 5, wherein the at least one plunger comprises a spring.

8. The pivotable stud track fitting assembly of claim 1, wherein the at least one pivotable insert comprises a pair of upper flanges and a pair of lower flanges.

9. The pivotable stud track fitting assembly of claim 1, wherein an axial direction of the pivot shaft is substantially parallel to a length of the track.

10. A pivotable stud track fitting assembly for attaching a seat leg of a passenger seat to a vehicle floor, the pivotable stud track fitting assembly comprising:
a track attached to the vehicle floor;
a base frame comprising an upper portion and a pivot shaft arranged so that the pivot shaft substantially aligns with an upper surface of the track when the base frame is coupled to the track;
at least one pivotable insert that engages the track and is pivotally coupled to and separately rotatable relative to the pivot shaft such that the base frame is rotatable relative to the track about the pivot shaft; and
at least one plunger coupled to the base frame, wherein the at least one plunger is moveable between a plurality of different positions,
wherein the upper portion is pivotally coupled to the seat leg of the passenger seat.

11. The pivotable stud track fitting assembly of claim 10, wherein at least a portion of the at least one pivotable insert comprises a cylindrical shape.

12. The pivotable stud track fitting assembly of claim 10, wherein the at least one pivotable insert slidably engages a slot of the track.

13. The pivotable stud track fitting assembly of claim 10, wherein the pivot shaft of the base frame is disposed within a slot of the track when the base frame is coupled to the track.

14. The pivotable stud track fitting assembly of claim 10, wherein the at least one plunger comprises a pair of spacers within a central body of the at least one plunger.

15. The pivotable stud track fitting assembly of claim 10, wherein the at least one pivotable insert comprises a pair of upper flanges and a pair of lower flanges.

16. The pivotable stud track fitting assembly of claim 10, wherein the at least one plunger comprises a spring.

17. The pivotable stud track fitting assembly of claim 10, wherein an axial direction of the pivot shaft is substantially parallel to a length of the track.

18. A pivotable stud track fitting assembly for attaching a seat leg of a passenger seat to a vehicle floor, the pivotable stud track fitting assembly comprising:
a track comprising a slot, wherein the track is attached to the vehicle floor;
a base frame comprising a pivot shaft that is disposed within the slot and arranged so that the pivot shaft substantially aligns with an upper surface of the track when the base frame is coupled to the track; and
at least one pivotable insert that engages the track and is pivotally coupled to and separately rotatable relative to the pivot shaft such that the base frame is rotatable relative to the track about the pivot shaft, wherein:
the slot comprises at least one lip; and
the at least one pivotable insert engages the at least one lip of the slot.

19. The pivotable stud track fitting assembly of claim 18, wherein a material used to form the at least one pivotable insert is heavier than the material used to form the base frame.

20. The pivotable stud track fitting assembly of claim 18, wherein at least a portion of the at least one pivotable insert comprises a cylindrical shape.

21. The pivotable stud track fitting assembly of claim 18, further comprising at least one plunger coupled to the base frame, wherein the at least one plunger is moveable between a plurality of different positions.

22. The pivotable stud track fitting assembly of claim 21, wherein the at least one plunger comprises a pair of spacers within a main body of the at least one plunger.

23. The pivotable stud track fitting assembly of claim 18, wherein the at least one pivotable insert comprises a pair of upper flanges and a pair of lower flanges.

24. The pivotable stud track fitting assembly of claim 18, wherein an axial direction of the pivot shaft is substantially parallel to a length of the track.

* * * * *